US012643072B2

(12) United States Patent
Ding et al.

(10) Patent No.: US 12,643,072 B2
(45) Date of Patent: Jun. 2, 2026

(54) SYSTEMS AND METHODS FOR ACOUSTICALLY-ENHANCED MEMBRANE SEPARATION

(71) Applicant: The Regents of the University of Colorado, Denver, CO (US)

(72) Inventors: Xiaoyun Ding, Superior, CO (US); Kieran Roy Fung, Denver, CO (US); Yifu Ding, Boulder, CO (US)

(73) Assignee: THE REGENTS OF THE UNIVERSITY OF COLORADO, Denver, CO (US)

( * ) Notice: Subject to any disclaimer, the term of this patent is extended or adjusted under 35 U.S.C. 154(b) by 376 days.

(21) Appl. No.: 18/525,489

(22) Filed: Nov. 30, 2023

(65) Prior Publication Data

US 2024/0181400 A1     Jun. 6, 2024

Related U.S. Application Data

(60) Provisional application No. 63/429,444, filed on Dec. 1, 2022.

(51) Int. Cl.
*B01D 65/08*          (2006.01)
(52) U.S. Cl.
CPC ........ *B01D 65/08* (2013.01); *B01D 2313/902* (2022.08); *B01D 2321/2058* (2013.01); *B01D 2321/2075* (2013.01)

(58) Field of Classification Search
CPC ...... B01D 2313/902; B01D 2321/2058; B01D 2321/2075; B01D 65/08
See application file for complete search history.

(56) References Cited

U.S. PATENT DOCUMENTS

2022/0260531 A1* 8/2022 Akkerman .......... G01S 15/8925

FOREIGN PATENT DOCUMENTS

WO     WO-2016115555 A1 * 7/2016 ......... B01D 63/0822

* cited by examiner

*Primary Examiner* — Dirk R Bass
(74) *Attorney, Agent, or Firm* — HOLZER PATEL DRENNAN

(57) ABSTRACT

Systems and methods for acoustically-enhanced membrane separation are described. The system may generally include a separation membrane and an acoustically-responsive structure positioned proximate the upstream side of the separation membrane. The system may further include a transducer for generating an acoustic field, wherein the acoustic field causes microstructures extending from the acoustically-responsive structure to oscillate and thereby create streaming effects in the region between the distal ends of the microstructures and the upstream side of the separation membrane. These streaming effects can prevent or remove separation membrane fouling, prevent the formation of cake layers on the separation membrane, and/or remove cake layer formed on a separation membrane.

13 Claims, 3 Drawing Sheets

SYSTEMS AND METHODS FOR ACOUSTICALLY-ENHANCED MEMBRANE SEPARATION

CROSS-REFERENCE TO RELATED APPLICATIONS

This application claims priority to U.S. Provisional Patent Application No. 63/429,444, filed Dec. 1, 2022, and entitled "SYSTEMS AND METHODS FOR ACOUSTICALLY-ENHANCED MEMBRANE SEPARATION", the entirety of which is hereby incorporated by reference.

BACKGROUND

Membrane separation processes are an ever-increasing practice implemented across industrial areas such as beverage and dairy processing, pharmaceutical cell capture, wastewater treatment, and water purification. Membrane fouling, one of the major obstacles faced during liquid-based membrane filtration, occurs by deposition of particles, macromolecules, biomolecules, microbials, salts, colloids, etc., on the membrane surface and/or within the pore structure of the membrane. Types of membrane fouling can be separated into two groups: reversible and irreversible fouling. Reversible fouling refers to the accumulation of particles on a membrane surface, while irreversible fouling refers to the event of pore clogging. In many cases, accumulation of foulants on a membrane form a cake layer on the membrane, which creates a pressure drop within the system, reduces permeate flux and system efficiency, and ultimately increases operational and materials costs.

While membrane fouling remains as a complex obstacle for the separation industry, methods and processes have been developed to address it. For most membrane applications, chemical and topographical properties of membrane surfaces dictate the interaction between membrane and contacting species. To reduce the fouling propensity of membranes, chemical- and physical-based surface modification have been extensively developed over the years. For instance, chemically grafting of "tailored" structures through radical polymerization and surface coating of discrete nanoparticles are both known to alleviate the extent of fouling. However, both grafted structures and coated antifouling layers are not permanent and degrade during long-term operation. As to the physical approach, surface-patterning has been experimentally demonstrated as an effective means to enhance local mass transfer near the membrane surface that decelerate the accumulation of foulants and improve membrane longevity. Nevertheless, surface patterns do not actively clean membrane surfaces upon significant cake layer formation; therefore, processes such as post-operation cleaning is typically needed to (partially) restore the permeability of membrane.

While membrane surface modifications seek to obstruct membrane fouling duration operation, membrane cleaning processes aim to maintain or restore original membrane flux. Membrane cleaning techniques involve two varieties: chemical and physical cleaning processes. Chemical membrane cleaning involves the use of chemical agents to remove irreversible foulants. The use of harsh chemicals, even under mild operating conditions, can cause membrane degradation. Physical membrane cleaning aims to improve separation operation by applying hydraulic or mechanical forces to remove membrane foulants, including, hydrodynamic forward or reverse flushing, permeate back pressure, air spurge and sponge ball cleaning. Notably, the aforementioned methods are often applied in combination to address reversible membrane fouling and to recover membrane permeability. However, constraints still exist with respect to physical membrane cleaning.

In view of the above, a need continues to exist for improved membrane separation systems that incorporate antifouling technologies.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some embodiments, an acoustically enhanced membrane separation system is described, the system comprising a separation membrane having an upstream side and a downstream side; an acoustically responsive structure comprising a plurality of microstructures extending away from a base portion of the acoustically responsive structure, wherein the distal ends of the plurality of microstructures are positioned proximate the upstream side of the separation membrane; and a transducer configured to generate an acoustic field. The system may be configured such that the acoustic field generated by the transducer excites resonation of the plurality of microstructures.

In some embodiments, a method of enhancing membrane separation is described, the method comprising: positioning an acoustically responsive structure proximate an upstream side of a separation membrane, wherein the acoustically responsive structure comprises a plurality of microstructures extending away from a base portion of the acoustically responsive structure; and generating an acoustic field proximate the acoustically responsive structure such that the generated acoustic field excites resonation of the plurality of microstructures.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE DRAWINGS

Non-limiting and non-exhaustive embodiments of the disclosed technology, including the preferred embodiment, are described with reference to the following figures, wherein like reference numerals refer to like parts throughout the various views unless otherwise specified.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Described herein are various embodiments of systems and methods for acoustically-enhanced membrane separation. In some embodiments, the systems and methods described herein mitigate membrane fouling, remove or prevent cake layer aggregations formed on a membrane, and/or improve separation through the membrane. The technology described herein is applicable in a variety of industries, including, but not limited to, food, biological, pharmaceutical, and water treatment industries. The methods described herein can be carried out in-situ, and can therefore reduce operation down-time and improve overall process efficiency.

Figure 1:
FIG. 1 is a schematic illustration of a system for acoustically-enhanced membrane separation according to various embodiments described herein.
Figure 1:
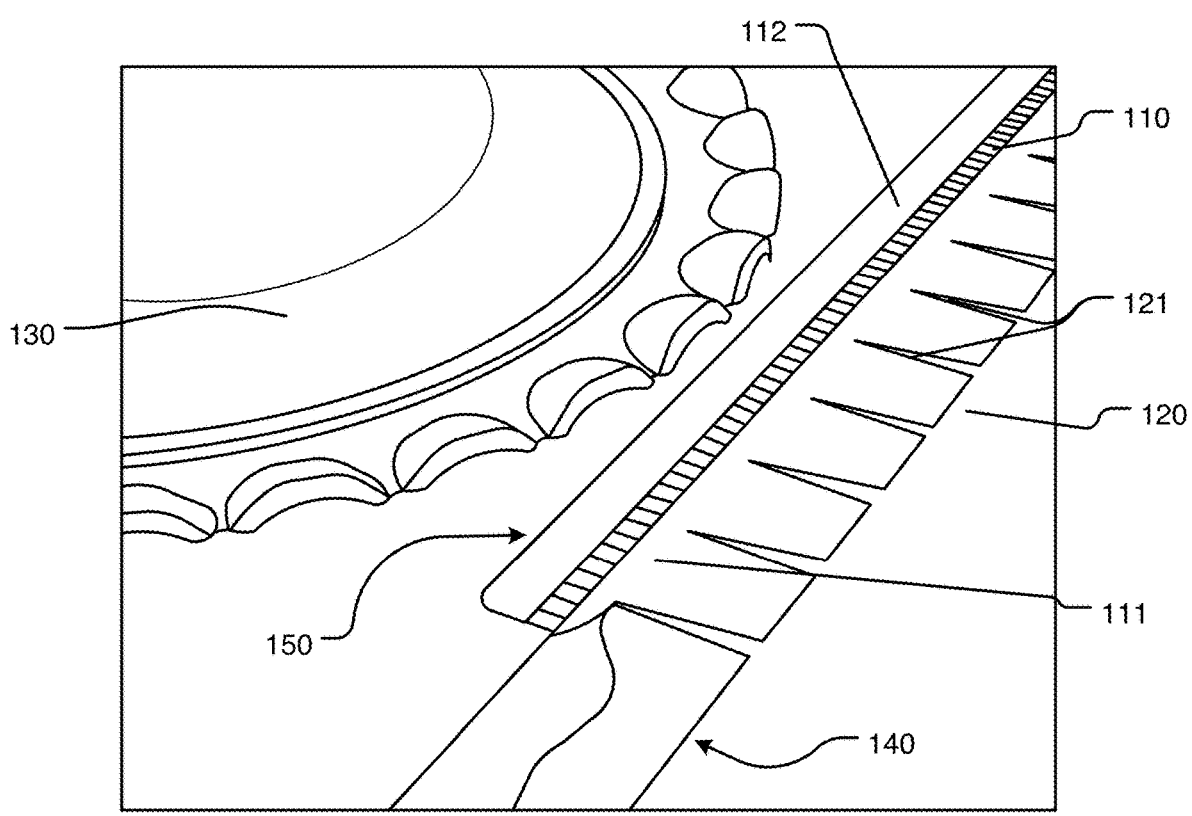

With reference to FIG. 1, an embodiment of a system 100 for acoustically enhanced membrane separation is shown. The system 100 generally includes a separation membrane 110 having an upstream side 111 and a downstream side 112, an acoustically responsive structure 120 having a plurality of microstructures 121 extending therefrom, and a transducer 130. The system further comprises a feed channel 140 for introducing material to be separated to the upstream side 111 of the membrane 110 and a permeate channel 150 for flowing material that has passed through the membrane 110 away from membrane 110.

The material of the separation membrane 110 is generally not limited and may be any type of membrane material capable of performing a separation of one or more components of the material as the material passes through the membrane. In some embodiments, the separation membrane 110 is configured for separation of fluid material that passes through the separation membrane 110. The separation membrane 110 may perform physical separation (i.e., where the size and/or shape of components of the material relative to the size and/or shape of the channels or pores in the membrane dictates what is and is not allowed to pass through the membrane), interaction-based separation (i.e., where material of the membrane interacts chemically, electrically, etc., with components of the material to thereby prevent components from passing through the membrane), or by any other known type of separation or combination of types of separations.

The dimensions of the membrane 110, as well as of the feed channel 140 and of the permeate channel 150, are generally not limited, and can be selected or modified based on the specific application, e.g., the specific material to be separated. The membrane 110 may further include pores and/or channels, or any other types of void spaces that allow material to pass from one side of the membrane 110 to the other, and these pore or channels may also have any suitable dimensions depending on the specific application. In some embodiments, the membrane, pores, channels, etc., may have dimensions in the micrometer scale. However, it should be appreciated that smaller and larger scales are possible.

The system 100 further includes an acoustically responsive structure 120 having a plurality of microstructures 121 extending therefrom. As shown in FIG. 1, the acoustically responsive structure 120 is positioned such that the distal ends of the microstructures 121 are located proximate the upstream side 111 of the membrane 110. The distance between the upstream side 111 of the membrane 110 and the distal ends of the microstructures 121 is generally not limited, though in some embodiments, it is preferable that the distance be small enough that streaming created by oscillation of the microstructures 121 impacts the upstream side 111 of the membrane 110 (e.g., such as by removing fouling material that may have formed on or near the surface of the membrane 110).

The number, spacing, shape, and size of the microstructures 121 extending away from the structure 120 are all generally not limited. FIG. 1 generally shows uniformly spaced microstructures 121 all having a generally cone-like shape and having approximately the same height. However, it should be appreciated that each microstructure 121 can have a different size, shape, and/or dimensions, and that uniform spacing is not required.

Figure 3:
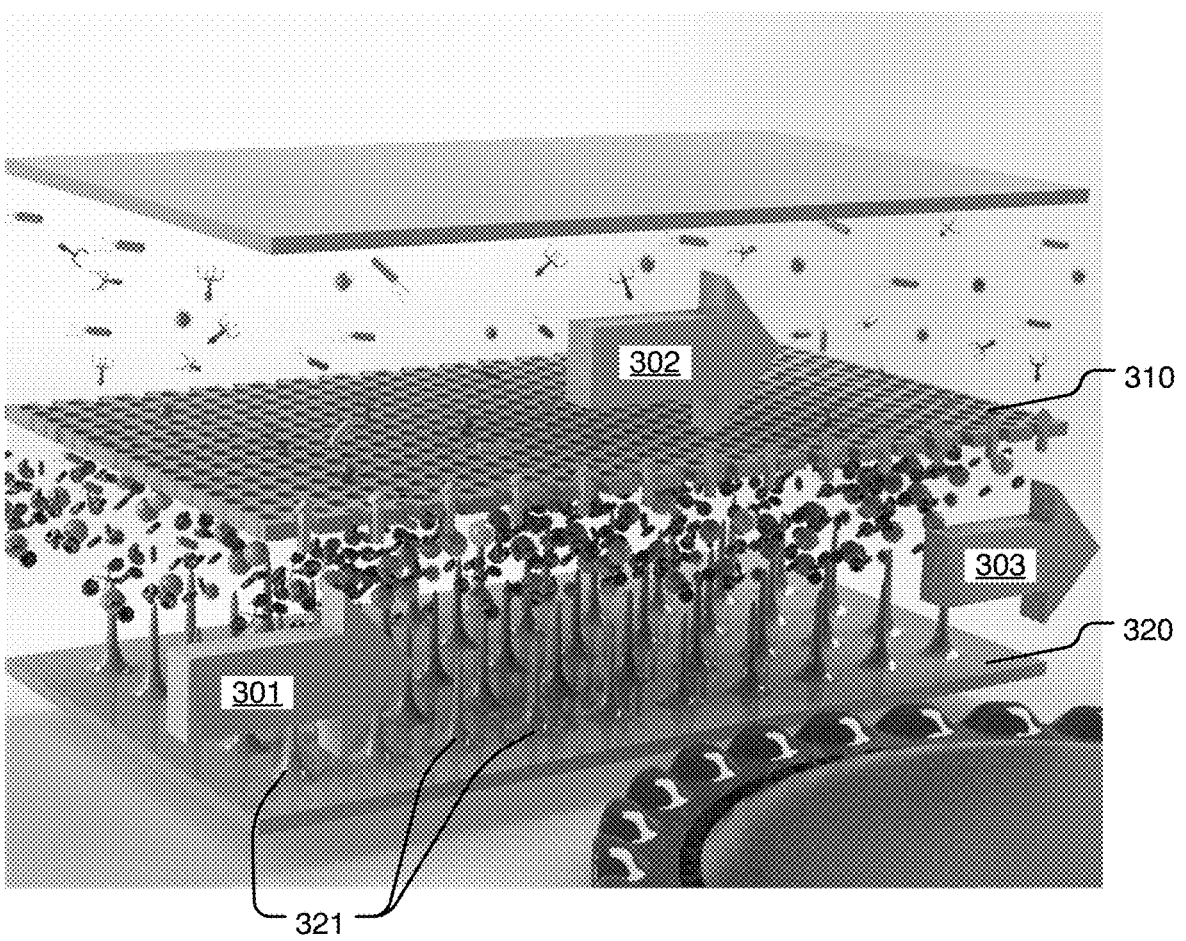
FIG. 3 is a schematic illustration of a system for acoustically-enhanced membrane separation according to various embodiments described herein

While FIG. 1 illustrates a generally two-dimensional set up for system 100, it should be appreciated that the system 100 may also have a depth dimension (i.e., have a three-dimensional configuration). In such embodiments, the microstructures 121 can be located anywhere on the surface of the support 120 facing the membrane 110, such as a three by three, nine by nine, or 25 by 25 array of microstructures. FIG. 3 illustrate a three-dimensional configuration wherein microstructures 321 are located both along the length and width dimension of the surface of the acoustically-responsive structure 320 facing the separation membrane 310. Arrow 301 in FIG. 3 illustrates the flow of the feed, arrow 302 illustrates the flow of the permeate, and arrow 303 illustrates the flow of the retentate.

The material of the support 120 and microstructures 121 is generally not limited provided that the microstructures 121 are capable of oscillating upon exposure to the acoustic field and/or vibrational energy resulting from the acoustic field. In some embodiments, the material of the support 120 and the microstructures 121 will be the same and the microstructures 121 and support 120 will be integrally formed as part of a unitary body. In other embodiments, the material of the microstructures 121 may be different from the support 120. Exemplary, though non-limiting, material that can be used for the microstructures 121 and/or support 120 includes polysulfone, poly(lactic acid), polyvinylidene fluoride, poly(ε-caprolactone), and polydimethylsiloxane, in any combination.

While FIG. 1 illustrates a system 100 wherein the longitudinal axis of the microstructures 121 is generally perpendicular to the upstream surface of the membrane 110, it should be appreciated that other orientations may be used, such as wherein the longitudinal axis of the microstructures 121 are oriented anywhere from 90 degrees to the surface of the membrane 100 (as shown in FIG. 1) to slightly less than parallel with the surface of the membrane 100.

The system 100 further includes a transducer 130 configured to generate an acoustic field. Any suitable transducer may be used for generating the acoustic field. In some embodiments, the transducer 130 is a piezoelectric transducer capable of generating ultrasound waves. In some embodiments, the transducer 130 is configured with respect to the rest of the system such that the generation of an acoustic field results in the creation and transmission of vibrational energy to the support 120 and/or the microstructures 121, thereby inducing oscillation in the microstructures 121. In one non-limiting example, the support 120 and transducer 130 are mounted on or otherwise connected to or with a common support material capable of transmitting vibrational energy from the transducer 130 to the support 120. The support material can be, e.g., a thin glass slide.

The transducer 130 can be operated with, e.g., variable frequencies and/or powers in order to change the characteristics of the acoustic field generated and thereby change the oscillation of the microstructures. Any other operational parameters of the transducer 130 can also be altered with this same aim. In this manner, the streaming created by the oscillating microstructures 121 can be altered, which may be useful in treating and/or removing different types and/or amounts of fouling and/or cake deposition.

With respect to the system 100 as a whole, the location of specific components of the system relative to one another and the distance between components is generally not limited provided that the acoustic field generated by the transducer 130 results in oscillation of the microstructures 121. In FIG. 1, the transducer 130 is shown as being on the downstream side 112 of the membrane 110. However, other configurations, such as where the transducer 130 is on the upstream side 111 of the membrane 110, are also possible.

In other embodiments of the technology described herein, the acoustically-responsive structure 120 is removed from system 100 and the microstructures 121 are instead formed on the upstream side 111 of the membrane 110. That is to say, the base of the microstructures 121 are attached to the upstream side 111 of the membrane 110 and the microstructures 121 extend away from the upstream side 111 of the membrane 110 such that their distal ends are located in the feed channel 140 a relatively short distance away from the upstream side 111 of the membrane 110. The overall result of this embodiment is similar to the previously described embodiments, in that an acoustic field is applied to cause oscillation of the microstructures 121 and thereby create local streaming effects at the distal ends of the microstructures 121. However, this embodiment is configured to ensure that the generation of the acoustic field results in vibrational energy being transmitted at least to the membrane 110 to thereby cause oscillation of the microstructures 121 connected to and extending away from the membrane 110, rather than requiring a configuration wherein the vibrational energy in transmitted to an acoustically-responsive structure that is separate from the membrane 110. As such, in some aspects of this embodiment, the transducer 130 may be mounted on a support (e.g., thin glass slide) on which the membrane 110 is also mounted to ensure vibrational energy is transmitted to the membrane 110.

It should also be appreciated that the technology described herein could include both of the previously described embodiments, i.e., where an acoustically-responsive support structure having microstructures extending therefrom is provided together with a membrane having microstructures extending therefrom.

In operation, embodiments of the system 100 as previously described generally perform by positioning the acoustically responsive structure 120 proximate the upstream side 111 of the separation membrane 110 such that the distal ends of the plurality of microstructures 121 extending away from the base portion of the acoustically responsive structure 120 are located proximate the upstream side 111 of the membrane 110, flowing a material to be separated between the structure 120 and the membrane 110, and, via the transducer 130, generating an acoustic field proximate the acoustically responsive structure 120 such that the generated acoustic field excites resonation of the plurality of microstructures 121. In this operation, mechanical vibrations generated from the acoustic field produced by transducer 130 are transmitted to the feed channel 140 and structure 120 in the form of Lamb waves. These Lamb waves cause the microstructures 121 to oscillate within the feed channel 140, which thereby generate acoustic streaming effects localized at the microstructure tips. The induced acoustic streaming effects are capable of particle capture and retention among the feed flow, generation of high shear stresses to resuspend particle aggregations, and promote particle flux across the membrane—depending on the degree of fouling.

Figure 2:
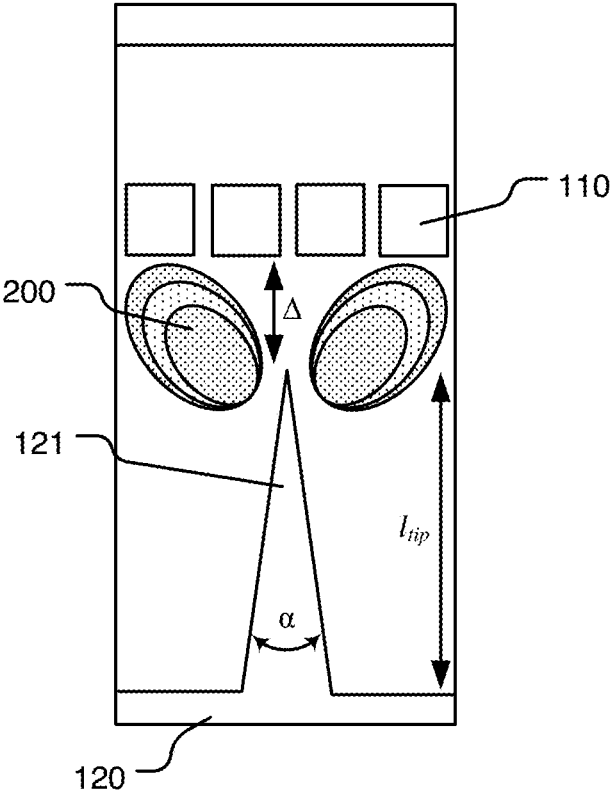
FIG. 2 is a schematic illustration of a portion of the system shown in FIG. 1 according to various embodiments described herein.

FIG. 2 provides an illustration of the creation of these streaming effects 200 at the tip of one microstructure 121 upon oscillation of the microstructure 121 via acoustic activation. The acoustic streaming actuation generates shear stress-inducing micro-vortices near the upstream side 111 of membrane 110, which enhance mass transfer and prevent particle aggregations near the pores of the membrane 110.

As also shown in FIG. 2, various characteristics of the microstructures 121 can be adjusted to impact the streaming effect created upon oscillation of the microstructures 121. FIG. 2 illustrates possible variations in the length of each microstructure 121 ($l_{tip}$), the angle of each cone-shaped microstructure 121 ($\alpha$), and/or the distance from the microstructure tip to the upstream side 111 of the membrane 110 ($\Delta$).

With specific respect to the distance parameter ($\Delta$), it is contemplated that the system 100 described herein may include means for automatically or manually adjusting the distance ($\Delta$) by moving the structure 120 closer to or further away from the membrane 110. Movement of the structure 120 may occur before, after, and/or during generation of the acoustic field. Alteration of the distance ($\Delta$) may impact the effect that the streaming produced by oscillating microstructures 121 has on removing or preventing fouling and/or cake formation on the membrane 110.

The method of operation described herein may also include the ability to vary the operation of the transducer 130, and thus vary the acoustic field produced thereby. In one non-limiting example, the frequency and/or power of the transducer 130 may be varied to create a varied acoustic field, which in turn will alter the manner in which the microstructures 121 oscillate. In some embodiments, the method may be carried out for a period of time using one frequency and power setting, followed by carrying out the method for a period of time using a different frequency and power setting. Such a change in operation of the transducer 130 during performance of the method described herein may allow for different types of fouling and/or cake formation to be treated based on the specific types of fouling or cake formation being responsive to different types of streaming effects.

The effect on fluid flow near the microstructure tips both can be observed when an acoustic field is applied and not applied. When the acoustic field is off, the flow near the microstructure tips is observed as being laminar, whereas when an acoustic field is applied, the oscillating microstructures develop localized micro-vortices near the microstructure tips and begin to perturb the flow field.

Experimentation shows the disruption of cake formation on the membrane when employing the systems and methods described herein. More specifically, experimentation shows cake formation on the membrane prior to application of the acoustic field, and the substantial removal of this cake layer from the membrane within about 100 milliseconds after the acoustic field is turned on to cause oscillation in the microstructures. As such, experimentation shows the efficacy of the methods and systems described herein.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. An acoustically enhanced membrane separation system, comprising:

A separation membrane having an upstream side and a downstream side;

An acoustically responsive structure comprising a plurality of microstructures extending away from a base portion of the acoustically responsive structure, wherein distal ends of the plurality of microstructures are positioned proximate the upstream side of the separation membrane; and A transducer configured to generate an acoustic field;

Wherein the system is configured such that the acoustic field generated by the transducer excites resonation of the plurality of microstructures and the distance between the distal ends of the plurality of microstructures and the upstream side of the membrane is adjustable.

2. The system of claim 1, wherein the separation system is configured for separating components of a fluid and resonation of the plurality of microstructures causes streaming in the fluid in the vicinity of the distal ends of the microstructures and the upstream side of the separation membrane.

3. The system of claim 1, wherein each of the plurality of microstructures has a cylindrical shape.

4. The system of claim 1, wherein each of the plurality of microstructures has a conical shape.

5. The system of claim 1, further comprising:

a support structure on which the acoustically responsive structure and the transducer are mounted, the support structure being configured to transmit vibrational energy resulting from generation of the acoustic field from the transducer to the acoustically responsive structure.

6. The system of claim 1, wherein the acoustic field comprises ultrasound waves.

7. A method of enhancing membrane separation, comprising:

Positioning an acoustically responsive structure proximate an upstream side of a separation membrane, wherein the acoustically responsive structure comprises a plurality of microstructures extending away from a base portion of the acoustically responsive structure;

Generating an acoustic field proximate the acoustically responsive structure such that the generated acoustic field excites resonation of the plurality of microstructures; and Prior to and/or during generating an acoustic field proximate the acoustically responsive structure, adjusting the position of the acoustically responsive structure such that distal ends of the plurality of microstructures are moved closer to or further away from the upstream side of the separation membrane.

8. The method of claim 7, wherein the distal ends of the plurality of microstructures are located proximate the upstream side of the separation membrane.

9. The method of claim 7, further comprising:

flowing a fluid to be subjected to membrane separation to the upstream side of the separation membrane prior to and/or during generating the acoustic field.

10. The method of claim 7, wherein each of the plurality of microstructures has a cylindrical shape.

11. The method of claim 7, wherein each of the plurality of microstructures has a conical shape.

12. The method of claim 7, wherein generating an acoustic field proximate the acoustically responsive structure such that the generated acoustic field excites resonation of the plurality of microstructures comprises transmitting vibrational energy resulting from generation of the acoustic field through a structure on which the acoustically responsive structure is mounted.

13. The method of claim 7, wherein the frequency, power, or both of the generated acoustic field are adjustable during the method.

* * * * *